United States Patent

[11] 3,574,468

| [72] | Inventor | Thomas S. Herman<br>Ypsilanti, Mich. |
|---|---|---|
| [21] | Appl. No. | 41,692 |
| [22] | Filed | May 25, 1970 |
| [45] | Patented | Apr. 13, 1971 |
| [73] | Assignee | Data Optics, Inc.<br>Ypsilanti, Mich.<br>Continuation of application Ser. No.<br>709,481, Feb. 29, 1968, now abandoned. |

[54] OPTICAL BENCH ASSEMBLY
22 Claims, 6 Drawing Figs.

[52] U.S. Cl. .................................................... 356/256,
350/287, 350/245
[51] Int. Cl. ...................................................... G02b 27/32,
G02b 7/02, G02b 7/18
[50] Field of Search ............................................ 356/256,
125; 350/287, 245, 321

[56] References Cited
UNITED STATES PATENTS

| 565,346 | 8/1896 | Goodyear, Jr. ............... | 350/287 |
|---|---|---|---|
| 1,849,305 | 3/1932 | Magarian ..................... | 350/245X |
| 2,597,168 | 5/1952 | North .......................... | 350/245X |
| 2,803,986 | 8/1957 | Choiniere et al. ............ | 350/245 |
| 3,253,499 | 5/1966 | Ingalls ......................... | 350/321 |

Primary Examiner—Ronald L. Wibert
Assistant Examiner—Conrad Clark
Attorney—Olsen and Stephenson ABSTRACT: Apparatus for setting up and investigating optical systems which have an elongated base portion adapted to be leveled and a flat plate on which optical mounts are positioned for movement in the longitudinal direction. The flat plate supports a guide bar or fail for guiding movement of the mounts. The guide bar carries a rack which is restricted to longitudinal movement along the length of the guide bar. The mounts can be positioned along the guide bar for facing in either longitudinal direction and have pinions in mesh with the rack, and means for turning such pinions so that the mounts can move relative to the rack. Each mount also has means for locking the rack against movement relative to the guide bar, so that when the rack is locked by one mount, each of the other mounts can be advanced or retracted from the locked mount or with respect to one another, merely by the turning of its pinion. Also, when the rack is free to travel and one mount is locked to the guide bar, then by turning the pinion of the locked mount any other mount locked to the rack is moved relative to the locked mount.

INVENTOR
THOMAS S. HERMAN

BY
Olsen and Stephenson
ATTORNEYS

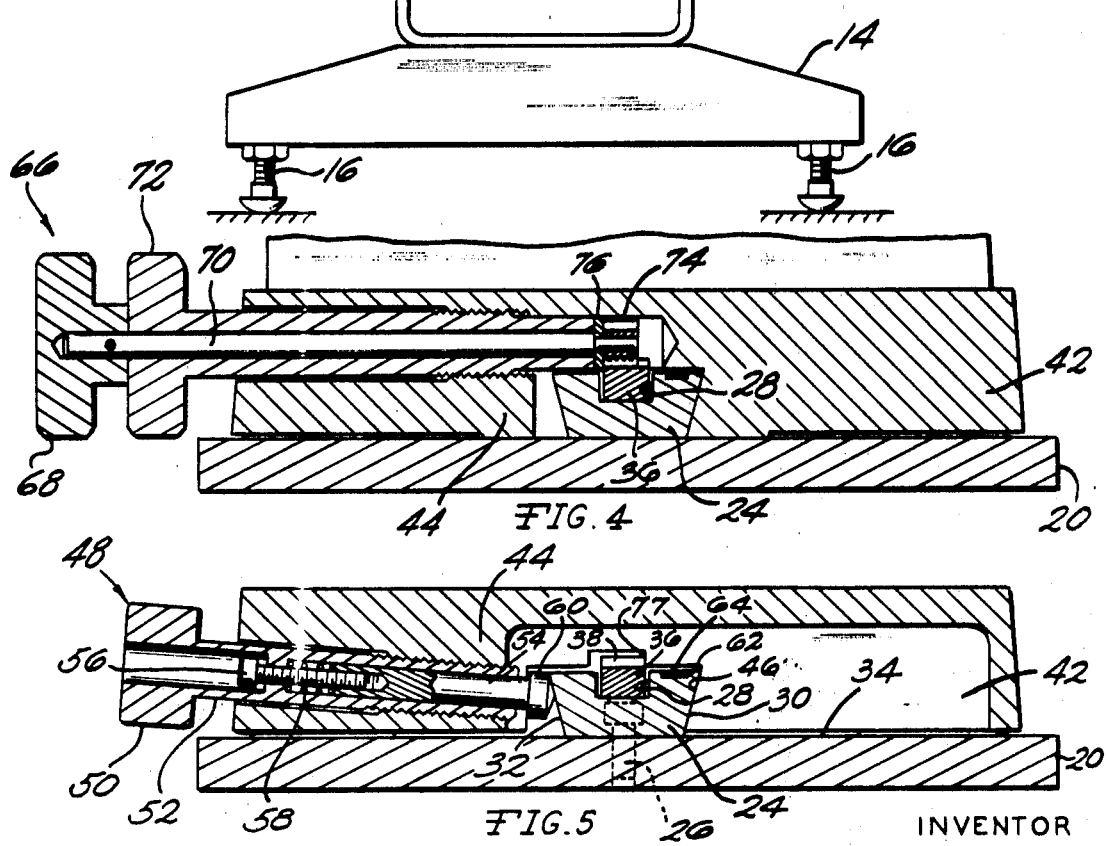

OPTICAL BENCH ASSEMBLY

This application is a continuation of Ser. No. 709,481, Feb. 29, 1968.

BACKGROUND OF THE INVENTION

The present invention relates to improvements in optical benches.

Optical research in recent years has brought a need for longer optical benches (over two and one-half meters) which are accurate and rigid enough to hold heavy lenses and maintain an optical axis accurate to a few thousandths of an inch. Optical benches which have been used heretofore fall generally in two broad classes comprising lightweight, inexpensive types which usually are of low accuracy as to optical alignment, and heavy precision optical benches which are relatively expensive and are usually accurate to 0.0005 to 0.005 inches optical alignment overall and can carry very heavy loads without deflecting excessively. The lightweight optical benches, previously known, are generally unsuitable for optical research as it is currently being conducted. Thus, the research that is being conducted normally must be conducted on the heavy precision type optical benches which are commonly made of heavy massive cast iron and are ground to the desired accuracy. Granite has also been used in recent years in connection with research work with good results. In an attempt to reduce weight and other costs, steel structural shapes have been used, such as channel beams, I beams and the like, for the base portion of the optical bench.

Structural beams of this type are not especially straight or flat, and the desired accurate surfaces must be machined. Furthermore, such beams have many internal stresses and strains and if excessive material is machined away, the beams may twist and bend to such a degree that they are not much more accurate than before. Thus, there is a need for an improved optical bench which has structural members which are relatively light in weight and which will support loads while maintaining accurate lateral alignment of the optical axis.

Most precision optical benches now being used are of the lathe bed type, that is, the mount has a V-surface in relation to a plane surface. This construction has many obvious alignment advantages, but present day optical research requires that optical mounts also be suitable for use on large granite or steel surface plates. For such purposes as these, the bottom of a mount should be a flat surface for maximum versatility.

One of the major difficulties of using a mount with a flat bottom is that the existing precision optical benches do not provide suitable means for laterally positioning the mount, especially when the mount is being moved along the axis of the optical system. Also, when conducting research, it is often desirable to clamp the mount in a fixed position, and it is essential in doing this that the clamp does not move the mount either axially or up from the flat reference surface on which the mount is supported. Thus, there is also a need to provide an optical bench which has improved features rendering it more universally applicable to various problems arising when setting up optical systems.

SUMMARY OF THE INVENTION

The present invention overcomes the shortcomings of the prior art discussed above, and utilizes a flat plate attached by leveling screws to a structural box beam. The flat plate can be leveled to compensate for any sag or twist, and on top of the flat plate is a guide bar which can be positioned for accurate lateral adjustment, and also to act as a clamping surface. Thus, the surfaces which determine the optical axis can be readjusted at any time. The box beam which is used has a maximum resistance to both bending and torsional deflection for a given weight. The sections need not be made thick and massive for purposes of construction, so as to avoid deflections due to grinding wheel pressures or warp due to release of strains, because alignment is done after all machining operations have been completed. The thickness of the sections is determined primarily by the load the optical bench must carry, and therefore, the optical bench can be made quite light compared to its accuracy and load carrying capacity.

Thus, according to a preferred form of the present invention, an optical bench is provided having an elongated box beam, and a plurality of leveling cross feet support said box beam along its length. An elongated flat plate is mounted lengthwise on said box beam and supported for vertical adjustment thereon by a plurality of vertically positioned adjustment screws. A longitudinal guide bar is fixed on the upper surface of said flat plate having a reference surface on one side along its length. A plurality of optical mounts are slidably supported on the flat plate, each of said mounts having a reference surface engageable with the reference surface of the guide bar and having holding means for maintaining the reference surface of the mount against the reference surface of the guide bar. In cross section, the guide bar has the shape of an inverted isosceles trapezoid and each of its inclined sides are adapted to act as reference surfaces which are inclined at an acute angle to the top surface of the flat plate. Each of the mounts has a reference surface inclined to fit against either of the guide bar reference surfaces and the holding means is a threaded mechanism which has two operative positions, the first being one in which the reference surface of the mount is urged against one of the guide bar reference surfaces to permit relative moving of the mount with respect to the guide bar while maintaining the proper axial alignment, and the second position is one in which the mechanism assumes a locked position against the guide bar to prevent such movement of the mount. In both positions of the locking mechanism, the angular positions of the reference surfaces are such as to provide a component of force urging the mount against the top surface of the flat plate. Thus, the mount, when a part of an optical system, is continuously urged against the flat surface on which it is supported.

Another feature of the present invention is the arrangement for moving the mounts relative to the flat plate. For this purpose, a rack is slidably positioned on the guide bar, and the mounts have pinions in mesh with the rack. Each mount has a mechanism for turning its pinion for moving the mount relative to the rack, and means for clamping the rack to the mount and the mount to the guide bar so that relative movement between the mount, guide bar and rack is provided. By virtue of these arrangements, other mounts can be moved relative to the fixed mount and relative to one another, merely by turning the pinion of each mount that is to be moved along the rack. Thus, by suitably setting mechanisms of the mounts any mount can be moved by turning of its own pinion, or any mount or combination of mounts can be moved remotely from one fixed mount by turning the pinion of the fixed mount.

Still another feature of the present invention is the arrangement whereby each mount can be faced in either longitudinal direction by virtue of the fact that each reference surface of the guide bar can be utilized for maintaining the mount in proper axial alignment.

Accordingly, it is among the objects of the present invention to provide an improved optical bench assembly which is characterized by its light weight compared to its accuracy and load carrying capacity, and to provide such an assembly which has greater versatility than can be realized using prior art devices.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 3 is an end elevation of the embodiment of the invention;

FIG. 4 is a section taken on the line 4—4 of FIG. 1;

FIG. 5 is a section taken on line 5—5 of FIG. 1; and

DESCRIPTION OF THE PREFERRED EMBODIMENT

Figure 1:
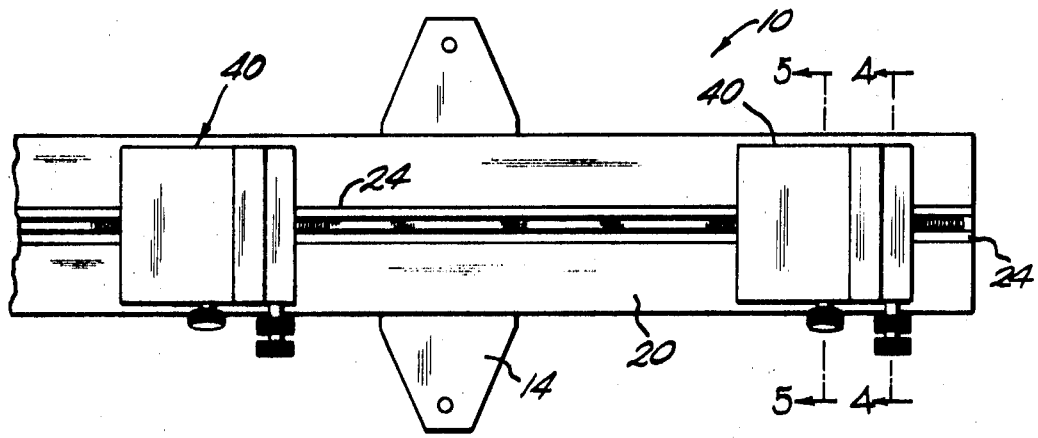
FIG. 1 is a fragmentary top plan view of an optical bench assembly embodying the present invention.
Figure 2:
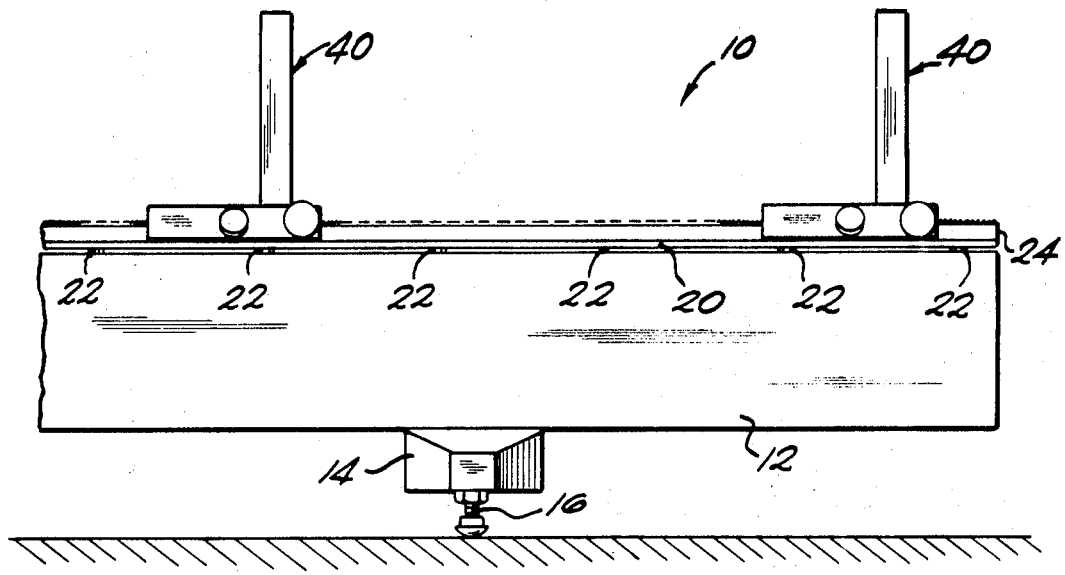
FIG. 2 is a fragmentary front elevation of the embodiment illustrated in FIG. 1.
Figure 6:
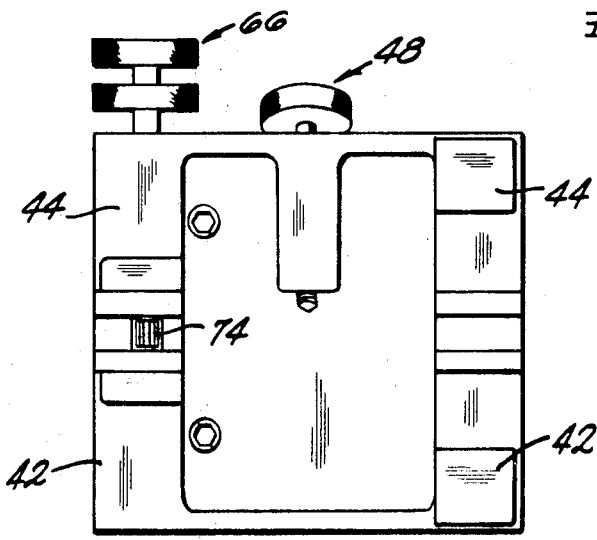
FIG. 6 is a bottom plan view of an optical mount forming a part of the optical bench assembly illustrated in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The optical bench assembly 10 includes the elongated box beam 12 which will provide maximum resistance to both bending and torsional deflection for a given weight. The box beam 12 is supported along its length by a plurality of leveling cross feet 14 which are supported by a plurality of leveling screws 16. Mounted on the upper section 18 of the box beam 12 is the elongated flat plate 20 which is secured to the section 18 by the plurality of leveling screws 22.

Mounted in fixed relation on the upper surface of the flat plate 20 is the longitudinal guide bar 24. The guide bar 24 is rigidly secured to the flat plate 20 in any suitable manner, a preferred arrangement being to fasten the parts together by means of a plurality of screws 26 which are screwed in place through the bottom of the longitudinal rack slot 28, as best seen in FIG. 5. In the illustrated embodiment, oversized screw holes are provided in the guide bar 24 to allow limited later adjustment of the guide bar 24 to assure accurate alignment.

The guide bar 24 has a transverse cross section conforming in shape generally to that of an inverted isosceles trapezoid. Thus, the opposite sides 30 and 32 define with the upper surface 34 acute angles of equal size but facing in the opposite directions. The opposite sides 30 and 32 provide reference surfaces and are machined to serve this purpose for uses which will presently be described. The rack slot or groove 28 is centrally located and extends lengthwise of the upper surface of the guide bar 24, and positioned within the slot 28 and slidable relative to the guide bar 24 is a rack 36 having its teeth 38 extending upwardly.

Positioned on the upper surface 34 of the flat plate 20 for sliding movement are a plurality of optical mounts 40. The structural details of only one of these mounts will be described, because the details that form a part of the present invention normally will be the same in each of these mounts. The optical mount 40 has a plurality of leg portions 42 and 44 disposed on opposite sides in straddling relationship to the guide bar 24. Each leg portion 42 has a reference surface 46 inclined at an angle so that it is in facing relationship with the reference surface 30. Thus, the angle defined by the reference surface 46 and the upper surface 34 is the supplementary angle of the acute angle defined by the reference surface 30 and the top surface 34. It is to be understood that the mount 40 can be reversed in its position on the flat plate 20 so that the reference surface 46 is placed in facing relationship with the reference surface 32 of guide bar 24, if it is desired to operate the optical bench with the mount in this particular position.

For the purpose of positioning the mount 40 so that its optical axis coincides with the optical axis of the system, a holding means 48 is provided for maintaining the reference surface 46 in engagement with the corresponding reference surface 30 of the guide bar 24. The construction of the holding means 48 can be seen best by reference to FIG. 5, to which attention is now directed for a description thereof. As there shown, the holding means 48 includes a clamping knob 50 which has a shaft portion 52 threadedly secured to the leg portion 44. The threaded portion has a hollow stem in which a plunger 54 is positioned for limited axial movement. For this purpose, a screw 56 is threadedly connected to one end of the plunger 54 to restrict its movement out of its bore, and a compression spring is operatively disposed to urge the plunger outwardly to the extent permitted by the screw 56. The outer end of the plunger 54 is a tip member 60 which has a conical end portion arranged to make a line contact with the reference surface 42 of the guide bar 24.

It will be recognized that when the clamping knob 50 is in the position shown in FIG. 5, the compression spring 58 is in an operative position for urging the plunger 54 against the surface 42 and an equal and opposite force will be exerted by the leg portion 42 through the reference surface 46 against the reference surface 30 of the guide bar 24. Thus, a caliperlike clamping action is exerted on the guide bar 24 by the mount 40, and the extent of clamping action is a direct function of the spring characteristics of the spring 58. The extent of clamping action can be selectively controlled by the setting of knob 50. Under these circumstances, the mount 40 can be moved lengthwise of the flat plate 20 while assuring the proper optical alignment is maintained between the bench and the mount.

If it should be desired to lock the mount 40 against movement along the length of the optical bench, this can be accomplished by means of the holding means 48. When such holding action is desired, the clamping knob 50 is screwed inwardly until its inner end abuts against the tip member 60 which will result in a substantially greater clamping action occurring, in caliperlike fashion, of the guide bar 24 by the tip member 60 and the reference surface 46.

From the foregoing description it is to be understood that the holding means 48 has three functional positions. When the clamping knob 50 has been screwed inwardly to its innermost position the holding means 48 is in its locked position. When the clamping knob 50 has been screwed outwardly to its outermost position it will be in a retracted position allowing removal of the mount 40 from the guide bar 24. When the clamping knob 50 is in an intermediate position, it will be in what may be termed a released position in that it will retain the mount 40 in operative position in optical alignment but will release its clamping action on the guide bar 24 to the extent to allow longitudinal travel of the mount 24 relative to guide bar 24. A still further function is performed by the holding means 48 in conjunction with the opposite reference surface 46. When the tip member 60 and the opposite reference surface 46 apply clamping forces against the opposite faces 30 and 32 of the guide bar 24, components of force will act on the mount to urge the same downwardly against the upper surface 34 of the flat plate 20, thereby further assisting in maintaining the mount in proper position at all times on the optical bench.

Also forming a part of the upper surface of the guide bar 24 is the slot 62 in which is positioned a scale 64 for aiding in properly locating the optical mount at a desired location along the length of the optical bench.

To further aid in relocating or adjusting the positions of the optical mounts, a positioning mechanism or pinion and clamp knob assembly 66 is provided, and for a description of this portion of the invention, reference is made particularly to FIG. 4. As there shown, a pinion knob 68 and connected shaft 70 are shown extending axially through a clamp knob 72 which is threadedly connected to the leg portion 44 of the mount 40. The shaft 70 has mounted on its inner end for rotation therewith the pinion gear 74, and disposed between the pinion and the clamp knob 72 is a freely rotatable washer 76.

When the clamp knob 72 is in a retracted position such as is shown in FIG. 4, the rack 36 will be free to move axially or longitudinally with respect to the guide bar 24. However, if the clamp knob 72 is screwed inwardly so that a clamping action is exerted between the washer 76 and the opposing face 77 (see FIG. 5) of the mount 40, the rack 36 will be locked in place relative to the mount 40. Thus, if the holding means 48 is set to a position for locking the mount 40 to the guide bar 24, and the clamp knob 72 is set to a position to lock the rack 36 and mount 40 together, the rack 36 will be locked in place relative to the guide bar 24.

Turning of the pinion knob 68 will have the direct effect of turning the pinion 74 so that relative movement will occur between the pinion 74 and the rack 36. If the rack 36 is free to slide in the groove 28 and relative to a fixed mount 40, then such turning action of the pinion knob 68 of the fixed mount will result in the rack 36 moving longitudinally in the groove 28. However, if the rack 36 has been locked in place relative to the guide bar 24 by means of some other mount, then such turning action of the pinion knob 68 will result in the pinion 74 traveling along the rack 36, moving the mount 40 in a corresponding manner. Thus, by properly using the pinion knob 68 and the clamp knob 72, the operator either can move the mount 40 relative to the guide bar 24, or, by maintaining the mount in a fixed position, can move the rack 36 relative to the mount 40 and the guide bar 24. When it is desired to move the rack relative to the mount 40 and the guide bar 24, the mount 40 will be locked in a fixed position on the guide bar by utilizing the holding means 48.

It will be recognized that the holding means 48 and the adjustment mechanism 66 can be used very advantageously to move one or more mounts on the optical bench relative to other mounts thereon. Thus, if it is desired to move one mount relative to another mount which is to be maintained stationary, this can be accomplished by initially locking the rack relative to the guide bar in a manner previously described, and thereafter, the mount which is to be moved can be transferred merely by placing its holding means 48 in a release position and turning its clamping knob 72 to a release position, after which the pinion knob 68 can be turned and the mount 40 will then travel on the rack 36 to the desired position with respect to the first mount. Also, the present invention permits movement from a remote position of one or more mounts. This is accomplished by locking one mount in a fixed position to the guide bar 24, and securing the mount or mounts which are to be moved to the rack 36. Then by turning the pinion knob 68 of the fixed mount, the rack 36 will be moved and the mount or mounts secured thereto will be moved a corresponding amount.

I claim:

1. An optical bench assembly comprising an elongated box beam, a plurality of leveling cross feet supporting said box beam along its length, an elongated flat plate mounted lengthwise on said box beam and supported for vertical adjustment thereon by vertical adjustment means, a longitudinal guide bar fixed on the upper surface of said flat plate having a reference surface on one side along its length, and a plurality of optical mounts slidably supported on said flat plate, each of said mounts having a reference surface for engagement with the reference surface of the guide bar and having holding means for retaining the reference surface of the mount against the reference surface of the guide bar.

2. An optical bench assembly according to claim 1, wherein the guide bar reference surface defines with said upper surface an acute angle, and each mount reference surface defines with said upper surface the corresponding supplementary angle.

3. An optical bench assembly according to claim 2, wherein said guide bar has a second reference surface on its other side, said second reference surface defining with said upper surface an acute angle of the same size as that associated with said one side, whereby each of said mounts can be positioned on the flat plate with its reference surface in engagement with either reference surface of the guide bar.

4. An optical bench assembly according to claim 3, wherein said holding means comprises a clamping-screw mechanism threadedly supported in the mount to be screwed in one direction into engagement with said second reference surface so that when the guide bar is clamped between the screw mechanism and the mount reference surface, components of force will urge the mount downwardly against said flat surface.

5. An optical bench assembly according to claim 4, wherein said clamping screw mechanism includes a spring-urged plunger having a first position for initially engaging said second reference surface when the mechanism is screwed in said one direction so as to yieldingly hold said guide bar to permit sliding movement of said mount on the first reference surface, said plunger having a limited stroke so that when said mechanism is screwed further in said one direction said plunger will have a second position holding said guide bar firmly against said first reference surface to prevent movement of said mount relative to said guide bar.

6. An optical bench assembly according to claim 1, wherein said adjustment means comprises a plurality of leveling screws positioned between said flat plate and said box beam.

7. An optical bench assembly according to claim 1, wherein said longitudinal guide bar has a rack extending lengthwise thereof, and each of said mounts has a pinion in mesh with said rack and means for turning said pinion to provide relative movement between said mount and said rack.

8. An optical bench assembly according to claim 1, wherein said longitudinal guide bar has a rack mounted thereon for longitudinal movement relative to said guide bar, and each of said mounts has a positioning mechanism comprising a pinion in mesh with said rack, means for turning said pinion, and means for optionally clamping it to said rack.

9. An optical bench assembly according to claim 8, wherein each of said mounts has a means for clamping it to said guide bar.

10. In an optical bench assembly, an elongated flat plate, a longitudinal guide bar fixed on the upper surface of said flat plate between the sides thereof and having a reference surface on one side along its length, and a plurality of optical mounts having spaced leg members straddling said guide bar and resting in sliding engagement on said upper surface, each of said mounts having a reference surface located on an inner side of the straddling leg members for engagement with the reference surface of the guide bar, and holding means for retaining the reference surface of the mount against the reference surface of the guide bar and for concurrently urging the mount against said upper surface.

11. In the optical bench assembly according to claim 10, wherein said guide bar has a cross section conforming to an inverted isosceles trapezoid so as to provide similar reference surfaces on its sides, said mounts each having their reference surfaces inclined to fit against either of the guide bar reference surfaces.

12. In the optical bench assembly according to claim 11, wherein said holding means includes a mechanism for yieldably holding the mount reference surface against one of the guide bar reference surfaces, said mechanism being movable to a second position for locking said mount reference surface against said one guide bar reference surface.

13. An optical bench assembly according to claim 12, wherein said longitudinal guide bar has a rack extending lengthwise thereof, and each of said mounts has a pinion in mesh with said rack and means for turning said pinion to provide relative movement between said mount and said rack.

14. In the optical bench assembly according to claim 13, wherein said rack is longitudinally movable relative to said guide bar, and each of said mounts has a means for optionally clamping itself to said rack.

15. In an optical bench assembly, an elongated bench member defining along its length a guide bar portion having a reference surface and below the guide bar portion and on both sides thereof a supporting surface portion, and a plurality of optical mounts having spaced leg members straddling said guide bar portion and resting in sliding engagement on said supporting surface portion, each of said mounts having a reference surface located on an inner side of the straddling leg members for engagement with the reference surface of the guide bar portion, said guide bar portion having a rack extending lengthwise thereof, and each of said mounts having a pinion in mesh with said rack and means for turning the pinion to provide relative movement between each mount and said rack.

16. In an optical bench assembly according to claim 15, wherein each of said mounts has a holding means for selectively securing the mount to the elongated bench member against longitudinal sliding movement relative to the bench member.

17. In an optical bench assembly according to claim 15, wherein each of said mounts has a means for locking its pinion against turning relative to said rack.

18. In an optical bench assembly according to claim 15, wherein said rack is longitudinally movable relative to said bench member.

19. In an optical bench assembly according to claim 15, wherein said rack is longitudinally movable relative to said bench member, and each of said mounts has a means for optionally clamping the mount to said rack.

20. In an optical bench assembly according to claim 19, wherein each of said mounts has a holding means for selectively securing the mount to the elongated bench member against longitudinal movement.

21. In an optical bench assembly, an elongated bench member having a reference surface and a supporting surface, and a plurality of optical mounts having spaced leg members straddling said reference surface and resting in sliding engagement on said supporting surface, each of said mounts having a reference surface located on a side of the straddling leg members for engagement with the reference surface, said bench member having a rack extending lengthwise thereof and supported for longitudinal movement, each of said mounts having (1) a pinion in mesh with said rack and means for turning the pinion to provide relative movement between the mount and the rack, (2) means for locking the pinion against turning relative to the rack, and (3) means for selectively securing the mount to the elongated bench member to hold the mount against longitudinal sliding movement relative to the bench member.

22. In an optical bench assembly, an elongated bench member having a rack extending lengthwise thereof and supported for longitudinal movement, and a plurality of optical mounts supported on said bench member for longitudinal sliding movement, each of said mounts having (1) a pinion in mesh with said rack and means for turning the pinion to provide relative movement between the mount and the rack, (2) means for selectively preventing relative movement between the mount and the rack so that the mount is movable with the rack, and (3) means for selectively securing the mount to the elongated bench member to hold the mount against longitudinal sliding movement relative to the bench member.